United States Patent
Marui

(10) Patent No.: US 10,328,994 B2
(45) Date of Patent: Jun. 25, 2019

(54) BICYCLE HANDLEBAR

(71) Applicant: Shinji Marui, Kobe (JP)

(72) Inventor: Shinji Marui, Kobe (JP)

( * ) Notice: Subject to any disclaimer, the term of this patent is extended or adjusted under 35 U.S.C. 154(b) by 2 days.

(21) Appl. No.: 15/663,374

(22) Filed: Jul. 28, 2017

(65) Prior Publication Data

US 2017/0327179 A1 Nov. 16, 2017

Related U.S. Application Data

(63) Continuation of application No. 14/948,915, filed on Nov. 23, 2015, now Pat. No. 9,725,128.

(30) Foreign Application Priority Data

Oct. 15, 2015 (JP) .................................. 2015-204067

(51) Int. Cl.
*B62K 21/12* (2006.01)
*B62K 21/18* (2006.01)

(52) U.S. Cl.
CPC .............. *B62K 21/12* (2013.01); *B62K 21/18* (2013.01)

(58) Field of Classification Search
CPC ........ B62K 11/14; B62K 21/12; B62K 21/14; B62K 21/145; B62K 21/18; Y10T 74/2078
See application file for complete search history.

(56) References Cited

U.S. PATENT DOCUMENTS

| | | | | |
|---|---|---|---|---|
| 6,182,529 B1 * | 2/2001 | White | ...................... | A61G 5/10 16/430 |
| 6,467,372 B2 * | 10/2002 | Klieber | ................. | B62K 21/16 74/551.1 |
| 7,118,302 B1 * | 10/2006 | Durham | ................. | B62K 21/04 403/344 |
| 9,815,515 B2 * | 11/2017 | Marui | ..................... | B62K 21/02 |
| 2011/0121538 A1 * | 5/2011 | Giroux | ................... | B62K 19/32 280/280 |
| 2018/0354577 A1 * | 12/2018 | Okuda | ................... | B62K 21/12 |

* cited by examiner

*Primary Examiner* — Adam D Rogers
(74) *Attorney, Agent, or Firm* — Innovation Capital Law Group, LLP; Vic Lin

(57) ABSTRACT

A lightweight handlebar configured to be coupled to a plurality of stems is characterized by the strength of the center portion not being a maximum. Moreover, the design may be such that a single handlebar is attached between two stems, wherein the strength at a center portion that is positioned between stem attaching positions is less than the strength of the portions that are positioned toward the outsides of the stem attaching portions. Moreover, a marker for indicating unsuitability for securing to a stem may be provided at the center portion of the handlebar.

19 Claims, 5 Drawing Sheets

BICYCLE HANDLEBAR

BACKGROUND OF THE INVENTION

1. Field of the Invention

The invention relates generally to bicycle handlebars.

2. Description of Prior Art and Related Information

FIG. 1 shows a conventional handle structure in a typical bicycle. As illustrated in FIG. 1, in the typical handle structure two fork legs 108, on the left and the right, having a mechanism for steering while supporting the axle of a front wheel 114, are connected by a fork crown 113 above the front wheel 114. Given this, the upper portion of the fork crown 113 is connected to a single steering column, or steering tube, 111. Additionally, the top end of the steering column 111 is connected to the handlebar 100, at a center portion 102, through a connecting component of a stem 109.

Moreover, the steering column 111 is borne rotatably in a front frame 17 through a head tube 10 of a front frame 17 (structured from a head tube 10, a top tube 15, and a down tube 16). Moreover, the axle of the front wheel is supported by dropouts (not shown) positioned at the bottom ends of the fork legs 108.

In this way, usually the typical bicycle handlebar is secured by a single stem at one location in the center portion thereof (for example, see Japanese Unexamined Patent Application Publication H7-300088). Because of this, the center portion of the handlebar, which serves as the position for attaching the stem, is subjected to strong loads through operation of the handle during riding. Moreover, along with the load due to operation of the handle, there are stresses because the handlebar is secured by the stem, and stresses due to the stem attaching position acting as a lever fulcrum. At these points, the center portion, which is the position in the conventional handlebar for attaching the stem, must have strength and rigidity greater than that of other portions.

That is, because in existing handlebars the design assumes that the handlebar will be secured using a stem in a single location in the center portion, it is necessary to increase the strength of the handlebar overall. Therefore, the diameter of the conventional handlebar is necessarily large, and the thickness of the material also large, making the prior art handlebar heavy.

FIG. 2 illustrates a handlebar that is attached to a stem in a single location in the center portion. As illustrated in FIG. 2, the handlebar 201 is a handlebar having a height difference between a center portion 202 and grip portions 4a and 4b, where a stem attaching position 203 is provided in a single location in the center portion 202. Because of this, if the strength of the center portion 202, which is at the stem attaching position 203, were reduced, then it would not be possible to maintain the strength of the handlebar. Consequently, in a handlebar of a shape wherein the stem is attached to a single location at the center portion, the structure of the present invention cannot be used.

SUMMARY OF THE INVENTION

In accordance with the present invention, structures and associated methods are disclosed which address these needs and overcome the deficiencies of the prior art.

As described above, when the handlebar is secured by two stems at positions other than the center portion of the handlebar, the load that is applied to the center portion between the stems is reduced. So a reduction in strength, stiffness and/or durability of the center portion of the preferred handlebar will not cause problems. However, because a conventional handlebar is manufactured without discriminating between the locations where strength, stiffness or durability is and is not required, the wall thickness of the material is thick even at locations that do not require strength, stiffness or durability, which wastes material and adds weight.

As used herein, "stiffness" is a relative term. When an element (such as a portion of a handlebar) exhibits less temporary deformation while a given force is applied, this element is considered "stiffer" than another such element.

As used herein, "Strength" is a relative term. When an element (such as a portion of a handlebar) exhibits less permanent deformation for a given force (applied once and then removed), this element is considered "stronger" than another such element. Moreover, when an element withstands a greater force (applied once and then removed) before it exhibits any measurable permanent deformation, it is considered "stronger" than another such element.

As used herein, "durability" is a relative term. When an element (such as a portion of a handlebar) exhibits less permanent deformation for a given cycle of force (repeatedly applied and removed), this element is considered "more durable" than another such element. Likewise, when an element withstands a greater number of cycles of force (repeatedly applied and removed) before it exhibits any measurable permanent deformation, this element is considered either "more durable" or "stronger" than another such element.

For simplicity, the term "strength", as used herein below, may generically refer to "stiffness", "Strength" and/or "durability" as defined above.

When an element, such as a portion of a handlebar, has an ability to resist a greater force before failure, this portion of the handlebar may have a greater "stiffness", a greater "Strength", and/or a greater "durability" as compared to another element. This force could include, for example, shear, axial, bending, moment and twisting moment. Various forces may be used to determine "stiffness", "Strength" and/or "durability" of a particular portion of the handlebar. Failure could refer to any change in the element, such as deformation, bending, twisting, breaking, separating, or the like.

In contemplation of the situation described above, the object of the present invention is to provide a handlebar that is able to achieve a reduction in weight while maintaining strength and rigidity when secured by a plurality of stems.

In order to solve the problem set forth above, in the handlebar according to the present invention the strength of the center portion is not at a maximum. As described above, when the handlebar is secured by two stems, respective stems are attached to positions that have predetermined distances to the left and the right of the center portion, rather than attaching a stem to the center portion of the handlebar. In the stem attaching positions there is the need for high strength and rigidity due to the application of the stresses caused by the handlebar being secured by the stem and the stresses applied through the attaching position for the stem acting as a lever fulcrum. However, on the other hand, these loads do not act on the center portion positioned between one stem and the other, so the strength of the center portion may be reduced to some degree since there is no need for the strength of the center portion to be at a maximum.

Moreover, the handlebar according to the present invention may be coupled to two stems, while the strength of a center portion between stem attaching portions may be less than the strength at a handlebar portion positioned to the outer side of the stem attaching portions.

Here the strength of the center portion of the handlebar not being high is because, rather than the handlebar being secured by a single stem, it is secured by two stems, provided at the top ends of the left and right fork legs, so that all that is necessary is to be formed with high strength at the securing locations. A similar strength material may also be used from the securing locations to both end portions. The methods for increasing strength may comprise increasing the outer diameter of the pipe, increasing the thickness of the pipe material, or using a material with high strength. Moreover, the method for increasing strength may be that of adding a reinforcing material. Specifically, the method may be one wherein a plate member is inserted into the pipe, or wherein the empty cavity of the pipe is filled.

In the handlebar according to the present invention, a marker for indicating unsuitability for securing a stem may be provided on the center portion positioned between the two stem attaching portions. If a high-strength portion and a low-strength portion are provided in the handlebar, and the stem is attached accidentally to the low-strength portion, there the handlebar might bend, or the like, during riding, which could cause an accident. Given this, a marker is provided at the low-strength location displaying that the location is unsuitable for attaching to the stem.

The marker may comprise printing indicating unsuitability for attachment, a sticker, one or more colors different from the colors of other portions, or a cross-sectional shape unsuitable for securing to a stem.

The center portion of the handlebar according to the present invention may be structured so as to be unsuitable for securing to a stem.

Here the structure that is unsuitable for securing may be one wherein the cross-sectional shape is not a circle or a regular polygonal (i.e., equal length sides and equal angles). The cross-sectional shape may have dimensions different from an existing standard dimension. The cross-section may also be non-uniform in the lengthwise direction of the handlebar. Because there is a standard for stems, forming the cross-sectional shape of the center portion of the handlebar with a shape that does not fit with the standard, as described above, makes attachment difficult, thereby preventing accidental attachment of the stem to a weaker location.

In the handlebar according to the present invention, a portion other than the center portion may be formed with a larger pipe outer diameter, with a thicker wall thickness of the pipe material, or with a material of a higher strength, when compared to that of the center portion.

Moreover, in the handlebar according to the present invention, a reinforcing material may be added to portions other than the center portion.

The handlebar according to the present invention has a reduced weight while preserving strength and rigidity when the handlebar is secured to a plurality of stems.

In summary, a lightweight handlebar configured to be coupled to a plurality of stems is characterized by the strength of the center portion not being at a maximum.

Moreover, the design may be such that a single handlebar is attached between two stems, wherein the strength at a center portion that is positioned between stem attaching positions is less than the strength of the portions that are positioned toward the outsides of the stem attaching portions. Moreover, a marker for indicating unsuitability for securing to a stem may be provided at the center portion of the handlebar.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS

Preferred embodiments according to the present invention will be described in detail below, referencing the drawings. Note that the scope of the present invention is not limited to the embodiments or drawings set forth below, but rather may be altered and modified in many ways.

Figure 1:
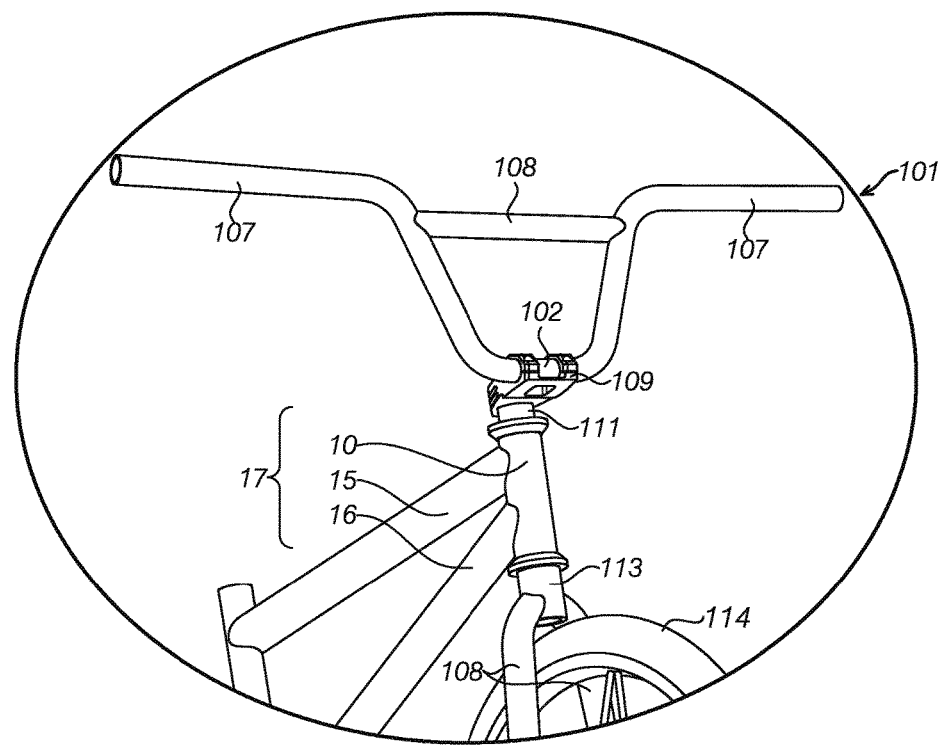
FIG. 1 is a perspective view of a prior art handlebar in a typical bicycle.
Figure 2:
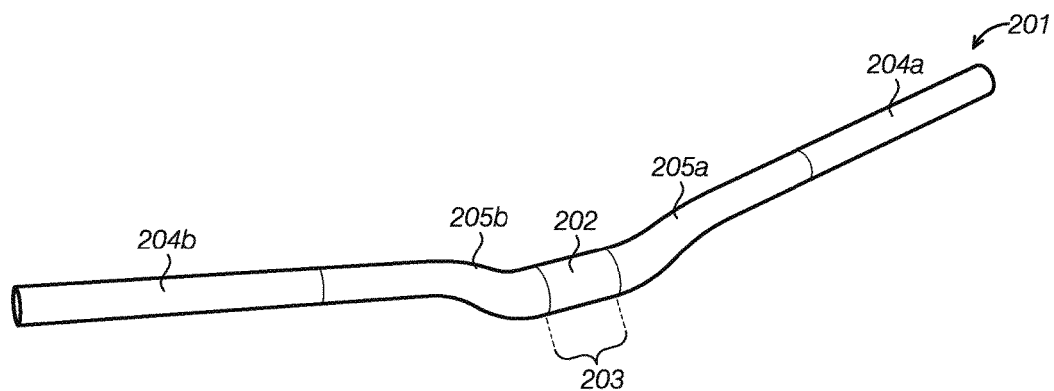
FIG. 2 is a perspective view of a prior art handlebar attached to a stem at one location.
Figure 3:
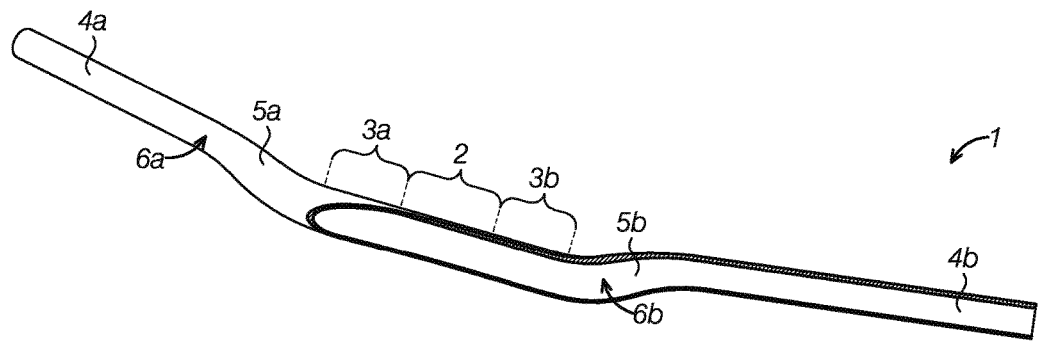
FIG. 3 is a structural diagram of a handlebar according to a first embodiment.

FIG. 3 illustrates a first preferred embodiment of a handlebar apparatus, or simply handlebar, 1 configured to be attached to stems at two locations. As illustrated in FIG. 3, the handlebar 1 comprises a center portion 2, stem attaching portions 3a and 3b, grip portions 4a and 4b, and bent portions 5a and 5b, where the bent portions 5a and 5b are provided so as to elevate the grip portions 4a and 4b when attached to the stem. While a particular shape for the handlebar 1 is shown, including bent portions 5a and 5b, the present invention may include handlebars of various shapes, with or without bent portions 5a and 5b, or with bent portions 5a and 5b having various and different bends formed therein.

Unlike the prior art handlebar, the preferred handlebar 1 is configured to be coupled to stems at two locations. Thus the strength will be adequate if the stem attaching portions 3a and 3b are attached securely, and the handlebar 1 is formed so as to have high strength from the stem attaching portions 3a and 3b to both end portions.

Figure 4:
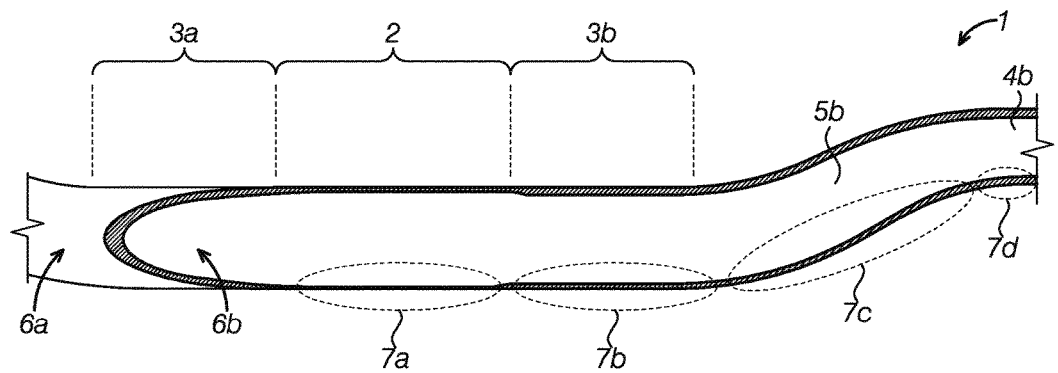
FIG. 4 is an enlarged view of the left side of a handlebar according to the first embodiment.

FIG. 4 presents an enlarged view of the left side of the first preferred embodiment of the handlebar 1. As illustrated in FIGS. 3 and 4, in the handlebar 1, no difference in thickness is provided on the outer surface 6a. However, as illustrated in FIG. 4, a difference in thickness is provided in the inner surface 6b, to cause uneven portions at the boundaries between the center portions 2 and the attaching portion 3a and 3b.

Moreover, the thickness 7b of the stem attaching portion 3b, the thickness 7c of the bent portion 5b, and the thickness 7d of the grip portion 4b are thicker than the thickness 7a of the center portion 2. This is because although strength is required from the stem attaching portions 3a and 3b to the grip portions 4a and 4b, because the handlebar 1 is attached to stems at the stem attaching portions 3a and 3b, no load acts on the center portion 2. Therefore, not as much strength is required in the center portion 2. Moreover, a weight reduction can be achieved, and raw materials costs can also be reduced, through having the center portion 2 be thin.

The thickness and diameter of the handlebar 1, including the center portion 2, stem attaching portions 3a, 3b, and the grip portions 4a, 4b may vary according to material and application. For example, tubing diameters from about 22.2 mm to about 31.8 mm may be used for one or more of the components of the handlebar 1. In some embodiments, the tubing diameters may be constant among each component (such as the center portion 2, stem attaching portions 3a, 3b, and the grip portions 4a, 4b), and in other embodiments, the tubing diameters may vary between the components. For example, the tubing diameters in the grip portions 4a, 4b may be less than 22.2 mm. The present invention contemplates tubing diameters described above as well as variations thereof. The tubing thickness may also vary depending on material and application. For example, steel tubing may be about 1.0 mm thick while aluminum may be about 0.7 mm or more in thickness. Of course, the present invention contemplates tubing thicknesses described above as well as variations thereof.

Figure 5:
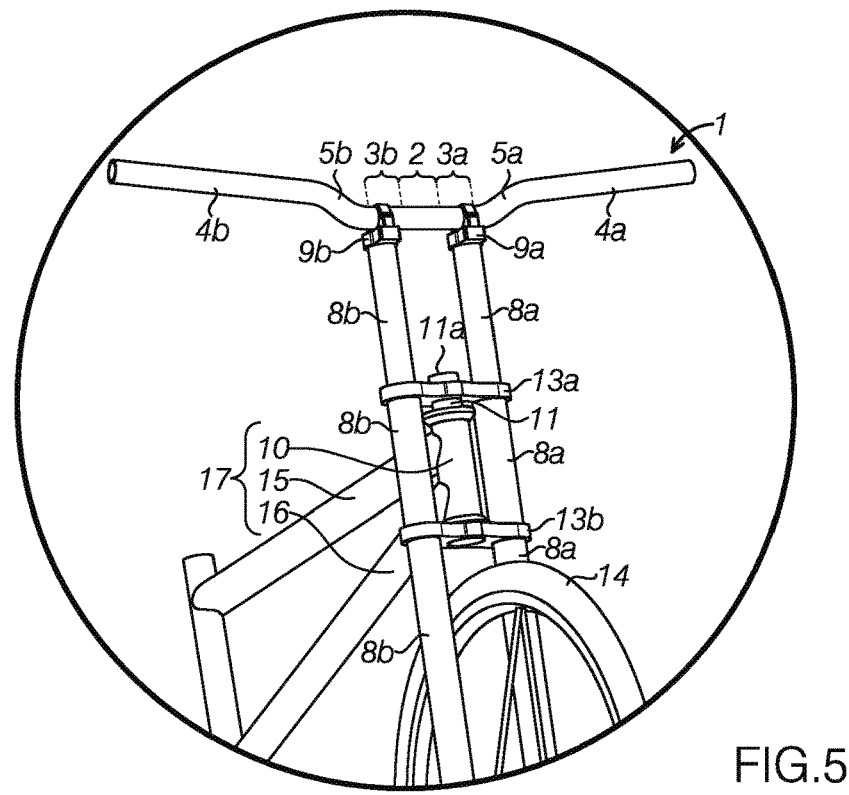
FIG. 5 is a diagram (1) of the attached state of the handlebar according to the first embodiment.
Figure 6:
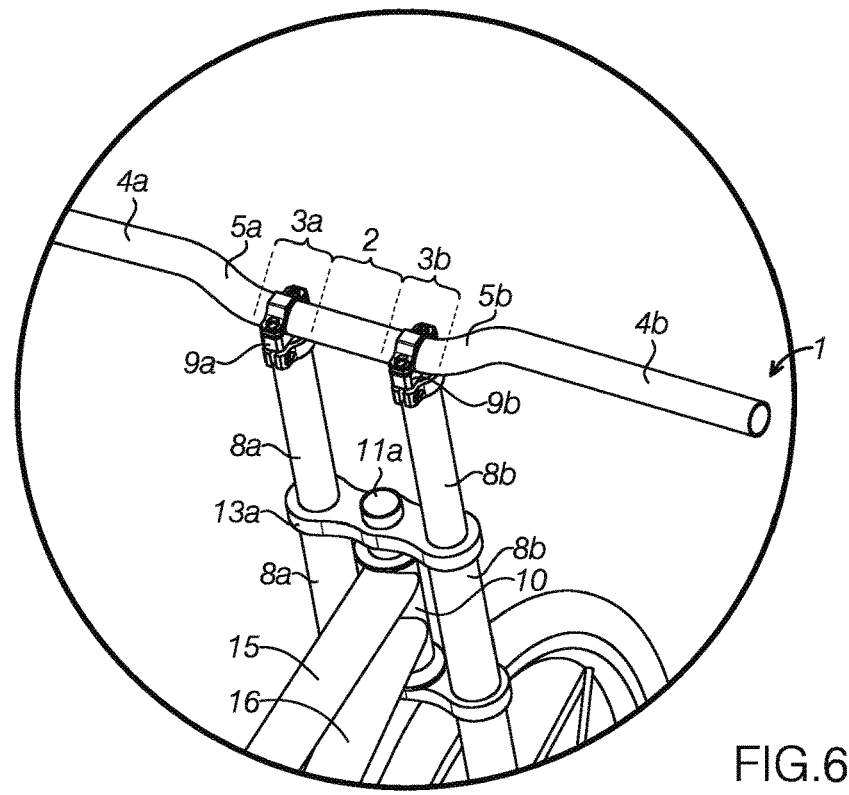
FIG. 6 is a diagram (2) of the attached state of the handlebar according to the first embodiment.

FIGS. 5 and 6 are operative views of the first preferred embodiment of the handlebar 1 attached to a bicycle. FIG. 5 is a front perspective view of the front fork and handlebar 1. In the first preferred handle structure 1, a steering column 11 that is borne rotatably on a head tube 10 of a front frame 17, and left and right fork legs 8a and 8b, are provided attached, in parallel, on the left and right of the steering column 11. The axle of the front wheel 14 is borne rotatably by dropouts (not shown) on the bottom ends of the left and right fork legs 8a and 8b. The top ends of the left and right fork legs 8a and 8b protrude adequately upward from the position of the top end 11a of the steering column 11. Two stems 9a and 9b are attached to the respective top ends of the left and right fork legs 8a and 8b, and a single handlebar apparatus 1 is coupled to these two stems 9a and 9b.

FIG. 6 is a rear perspective view of the front fork and handlebar apparatus 1.

The left and right fork legs 8a and 8b protrude above the top end 11a of the steering column 11, through holes provided in the left and right end portions of a fork crown 13a. The two stems 9a and 9b are provided on the top ends of the left and right fork legs 8a and 8b. Given this, the handlebar 1 is secured to the top ends of the left and right fork legs 8a and 8b by the two stems 9a and 9b at the stem attaching portions 3a and 3b.

Figure 7:
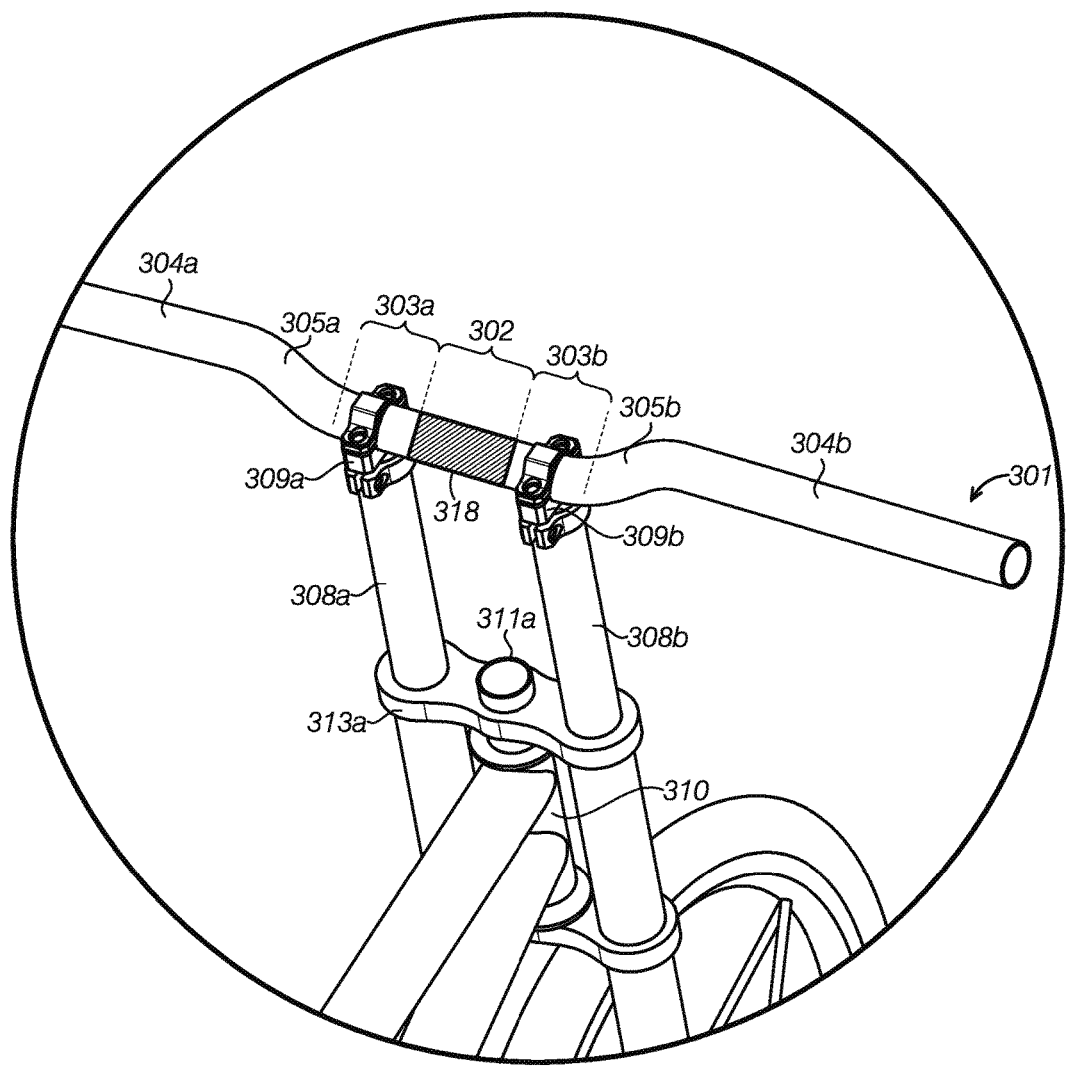
FIG. 7 is a diagram of the attached state of a handlebar according to a second embodiment.

FIG. 7 is a rear perspective view of a second preferred embodiment of a handlebar apparatus 301. As illustrated in FIG. 7, the handlebar apparatus 301 is formed from a center portion 302, stem attaching positions 303a and 303b, grip portions 304a and 304b, and bent portions 305a and 305b, similar to the first preferred embodiment of the handle apparatus 1.

However, unlike the first embodiment, a marker 318 is provided in the center portion 302, indicating that the center portion 302 is a part where the strength is weak. The marker 318 is provided through providing a pattern that is different from other portions; however, the marker 318 may instead comprise printing indicating unsuitability for attachment, a sticker, coloring different from other portions, or a cross-sectional shape that is unsuitable for attachment to a stem.

The stems 309a and 309b are attached to stem attaching portions 303a and 303b where there is no marker 318. The provision of this marker clearly distinguishes the strong portions from the weak portions, making it possible to prevent a stem from being connected to a weak portion by accident.

Figure 8:
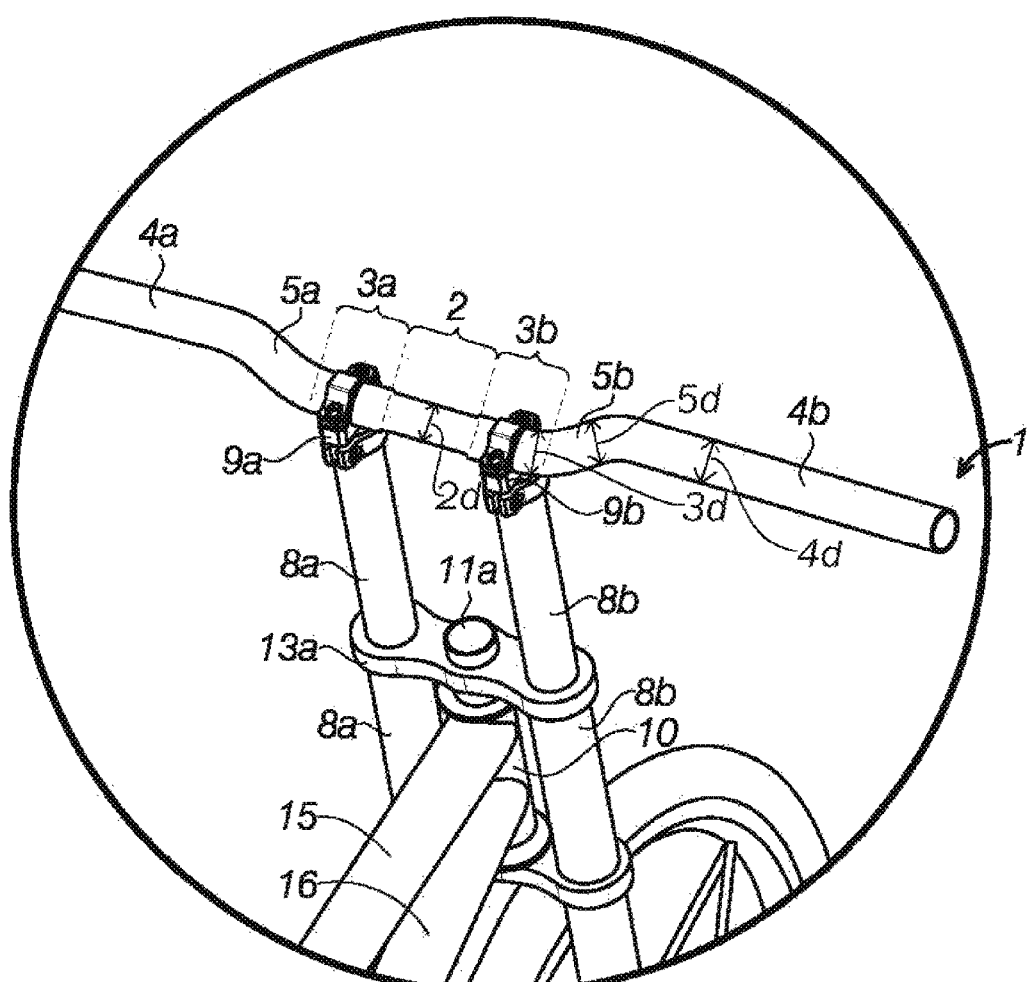
FIG. 8 is a diagram of the attached state of the handlebar according to an exemplary embodiment.

FIG. 8 shows an exemplary embodiment of the present invention where a center portion outer diameter 2d may be less than at least one of a grip portion outer diameter 4d, a stem attachment portion outer diameter 3d and a bent portion outer diameter 5d.

The preferred handle apparatuses are useful for sports use, used by bicycle users who attach and remove handlebars.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a sub combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A bicycle handlebar apparatus, comprising:
    a center portion;
    a first stem attaching portion on a first side of the center portion, the first stem attaching portion attaching to a first fork leg;
    a second stem attaching portion on a second, opposite side of the center portion, the second stem attaching portion attaching to a second fork leg;
    a first grip portion extending from the first stem attaching portion; and
    a second grip portion extending from the second stem attaching portion, wherein the first stem attaching portion and the second stem attaching portion are structured to resist a greater bending force, as compared to the center portion; and the first grip portion and the second grip portion are structured to resist the same bending force, as compared to first stem attaching portion and the second stem attaching portion.

2. The bicycle handlebar apparatus of claim 1, wherein the first stem attaching portion and the second stem attaching portion have at least one of a greater stiffness, a greater strength and a greater durability as compared to the center portion.

3. The bicycle handlebar apparatus of claim 1, wherein:
the center portion has a center portion wall thickness;
the first stem attaching portion has a first stem attaching portion wall thickness;
the second stem attaching portion has a second stem attaching portion wall thickness; and
the center portion wall thickness is less than the first stem attaching portion wall thickness and the second stem attaching portion wall thickness.

4. The bicycle handlebar apparatus of claim 3, further comprising:
a first bent portion positioned between the first stem attaching portion and the first grip portion, the first bent portion having a first bent portion wall thickness;
a second bent portion positioned between the second stem attaching portion and the second grip portion, the second bent portion having a second bent portion wall thickness;
wherein the center portion wall thickness is less than the first bent portion wall thickness and the second bent portion wall thickness.

5. The bicycle handlebar apparatus of claim 1, further comprising a marker provided on the center portion for indicating unsuitability for securing a stem.

6. The bicycle handlebar apparatus of claim 5, wherein the marker comprises at least one of printing on the center portion, a sticker, and coloring that is different from another portion.

7. The bicycle handlebar apparatus of claim 1, wherein the center portion of the handlebar is structured so as to be unsuitable for securing to the first stem attaching portion and the second stem attaching portion.

8. The bicycle handlebar apparatus of claim 1, wherein the center portion is formed with a larger pipe inside diameter than pipe inside diameters of each of the first and second stem attaching portions.

9. The bicycle handlebar apparatus of claim 1, wherein the center portion does not include a reinforcing material.

10. A bicycle handlebar apparatus, comprising:
a center portion having a center portion wall thickness;
a first stem attaching portion and a second stem attaching portion laterally joined to the center portion, the first stem attaching portion having a first stem attaching portion wall thickness, the second stem attaching portion having a second stem attaching portion wall thickness; and
a first grip portion and a second grip portion extending from, respectively, the first stem attaching portion and the second stem attaching portion, the first grip portion having a first grip portion wall thickness, the second grip portion having a second grip portion wall thickness, wherein
the first stem attaching portion and the second stem attaching portion are structured to resist a greater bending force, as compared to the center portion;

the first grip portion and the second grip portion are structured to resist a greater bending force, as compared to the center portion.

11. The bicycle handlebar apparatus of claim 10, further comprising:
a first bent portion positioned between the first stem attaching portion and the first grip portion, the first bent portion having a first bent portion wall thickness;
a second bent portion positioned between the second stem attaching portion and the second grip portion, the second bent portion having a second bent portion wall thickness;
the first bent portion and the second bent portion are structured to resist a greater bending force, as compared to the center portion.

12. The bicycle handlebar apparatus of claim 10, wherein the center portion comprises a marker for indicating unsuitability for securing to a stem.

13. The bicycle handlebar apparatus of claim 10, wherein the center portion does not include a reinforcing material.

14. A bicycle handlebar apparatus, comprising:
a center portion;
a first stem attaching portion on a first side of the center portion;
a second stem attaching portion on a second, opposite side of the center portion;
a first grip portion extending from the first stem attaching portion;
a second grip portion extending from the second stem attaching portion;
a first bent portion positioned between the first stem attaching portion and the first grip portion, the first bent portion having a first bent portion outer diameter and a first bent portion wall thickness; and
a second bent portion positioned between the second stem attaching portion and the second grip portion, the second bent portion having a second bent portion outer diameter and a second bent portion wall thickness, wherein
a center portion wall thickness is less than each of a first stem attaching portion wall thickness and a second stem attaching portion wall thickness, a first grip portion wall thickness and a second grip portion wall thickness, and the first bent portion wall thickness and the second bent portion wall thickness;
the first stem attaching portion and the second stem attaching portion are structured to resist a greater bending force, as compared to the center portion; and
the first grip portion and the second grip portion are structured to resist a greater bending force, as compared to the center portion.

15. The bicycle handlebar apparatus of claim 14, wherein an outside diameter of the center portion is less than or equal to an outside diameter of each of the first grip portion and the second grip portion.

16. The bicycle handlebar apparatus of claim 14, wherein a center portion outer diameter is less than the first bent portion outer diameter and the second bent portion outer diameter.

17. The bicycle handlebar apparatus of claim 14, wherein:
a center portion outer diameter is less than a first grip portion outer diameter and a second grip portion outer diameter, and
the center portion wall thickness is less than the first grip portion wall thickness and the second grip portion wall thickness.

18. The bicycle handlebar apparatus of claim 14, wherein the center portion comprises a marker for indicating unsuitability for securing to a stem.

19. The bicycle handlebar of claim 14, wherein the center portion does not include a reinforcing material.

\* \* \* \* \*